April 6, 1965 K. E. GOLDEN 3,176,581
STILL PICTURE PROJECTOR
Filed Nov. 13, 1962 2 Sheets-Sheet 1

INVENTOR.
KENNETH E. GOLDEN
BY
BUCKHORN, BLORE, KLARQUIST & SPARKMAN
ATTORNEYS

April 6, 1965    K. E. GOLDEN    3,176,581
STILL PICTURE PROJECTOR
Filed Nov. 13, 1962    2 Sheets-Sheet 2

INVENTOR.
KENNETH E. GOLDEN
BY
BUCKHORN, BLORE, KLARQUIST & SPARKMAN

ATTORNEYS

United States Patent Office 3,176,581
Patented Apr. 6, 1965

3,176,581
STILL PICTURE PROJECTOR
Kenneth E. Golden, Portland, Oreg., assignor to Sawyer's Inc., Progress, Oreg., a corporation of Oregon
Filed Nov. 13, 1962, Ser. No. 236,949
7 Claims. (Cl. 88—28)

This invention relates to a still picture projector, and more particularly to a projector for projecting pictures carried by an elongated slide mount.

An object of the invention is to provide a new and improved still picture projector. Another object of the invention is to provide a projector having a low silhouette.

A further object of the invention is to provide a projector for projecting pictures from transparencies carried by an elongated slide mount.

Another object of the invention is to provide a projector of simple and durable construction.

A further object of the invention is to provide a projector in which there is a gently curved guide chute for feeding a stiff, elongated slide mount to and from a projecting position.

A projector illustrating certain features of the invention may include a light path along which are positioned a light source, slide mount guiding means and an objective or projection lens, together with an arcuate, open, slide mount guide extending downwardly and forwardly from the film guiding member for guiding a film strip to and from the projecting position. The projector may include a front housing section carrying the projection lens and having an arcuate channel-shaped strip guide extending downwardly and forwardly under the projection lens with guide means positioned between the front housing section and the rear housing section which contain the light source.

A complete understanding of the invention may be obtained from the following detailed description of a projector forming a specific embodiment thereof, when read in conjunction with the appended drawings, in which.

Figure 1:
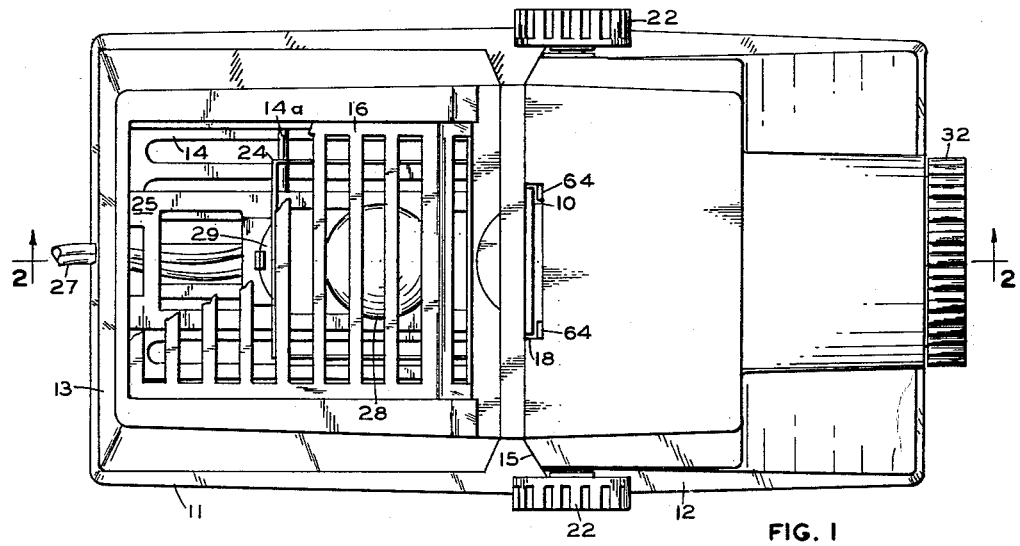
FIG. 1 is a top plan view of a projector forming one embodiment of the invention.

Referring now in detail to the drawings, the projector shown therein and forming one embodiment of the invention serves to project images from an elongated multi-transparency strip or slide 8, which includes a relatively stiff cardboard mount 10 carrying transparencies 9. The slide projector has a housing composed of four plastic parts or sections 11, 12, 13 and 14. The rear section 11 and the front section 12 are fastened together by spot fusing the two sections together along the meeting line 15 and anchor-type fasteners 15a embedded in the sections 11 and 12. The base section 14, which has a ventilating bottom grill 14a and integral, molded legs 14b, is similarly spot-adhered to the sections 11 and 12. The section 13 is a lamp cover and has a ventilating grill 16 at the upper end thereof. The sections 11 and 12 have a guide 17 extending from an opening 18 downwardly past an aperture 19, and a pair of rubber advancing rolls 20 mounted on a shaft 21 are rotatable by either of knurled hand wheels 22 to index the strip slide relative to the aperture 19 and feed it along a chute or guideway 23. The aperture 19 and guide 17 are parts of an aperture plate or partition wall 26 of the housing section 11.

A lamp chimney housing 24 is mounted on a support 25 carried by the section 11 and a lamp 28 is supplied with power by an electric cord 27. The lamp is positioned between a reflector 29 and a condenser lens 30. The objective lens of the projector has a rear lens 31 fixed in the section 12 between an apertured wall 34 of the section 12 and a plastic lens retaining ring 35 fitting in a socket 36 in the wall 34 and spot-adhered to the wall 34. The objective lens also includes a front lens 37 carried by elongated, tubular lens holder 32, which is slidable in a guideway 33 formed in the housing section 12 for focusing.

Figure 4:
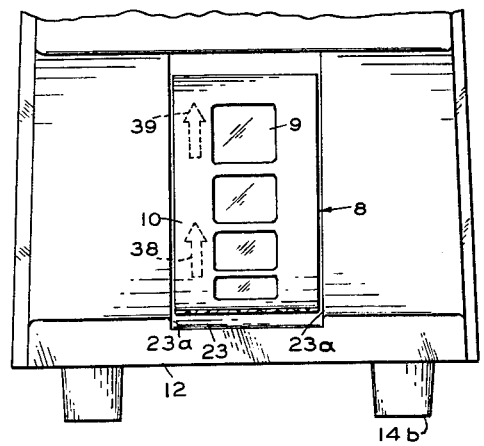
FIG. 4 is a fragmentary, front elevation view of the projector taken along line 4—4 of FIG. 2.

The provision of the curved chute 23 permits the projector to be quite low and compact, and the curve of the chute 23 is sufficiently gentle that the cardboard or plastic mounts 10 are not broken as they are guided therearound. While the slide 8 may be inserted either into the top of the projector or the bottom of the projector, it is preferred to feed the strip into the projector from the chute 23. To orient the slide 8 correctly for projecting a related sequence of the transparencies in the desired order, and position, the base of the chute has an arrow-shaped depression 38 (FIG. 4) molded in the upper surface thereof and the mount 10 has at the forward end of one edge portion an arrow 39. To properly orient the slide, the slide is placed with the arrow 39 directed in the same direction as the arrow-shaped depression 38, with the arrow 39 on the same side of the chute as the depression 38 and with the arrow 39 pointing in the same direction as that of the arrow-shaped depression 38. The upper end of the slide then is pushed upwardly along the chute 23 into the bite of the rolls 20, sidewalls 23a of the chute serving to guide the slide.

The support 25 is composed of dielectric plastic material fused at its ends to the housing section 11 and has openings 50 and 51 for entrance of cooling air into the chimney housing 24. The support 25 also includes a transverse portion 52 supporting a lamp socket 54 having an anchor portion 56 embedded in the portion 52. The chimney housing 24 has tabs (not shown) projecting through wall 11a and formed to retain the housing 24 in the position shown. Also, projections 11b of the wall 11a receive the edges of the walls of the housing 24 to precisely position the housing so that reflector 29 and lens 30 are precisely aligned with the aperture 19. The lens 30 is carried by a lens-holding plate 60 of the housing 24 and having tabs 62 projecting through holes in the sidewalls of the housing 24 to precisely locate the lens 30 in the chimney housing 24.

Figure 2:
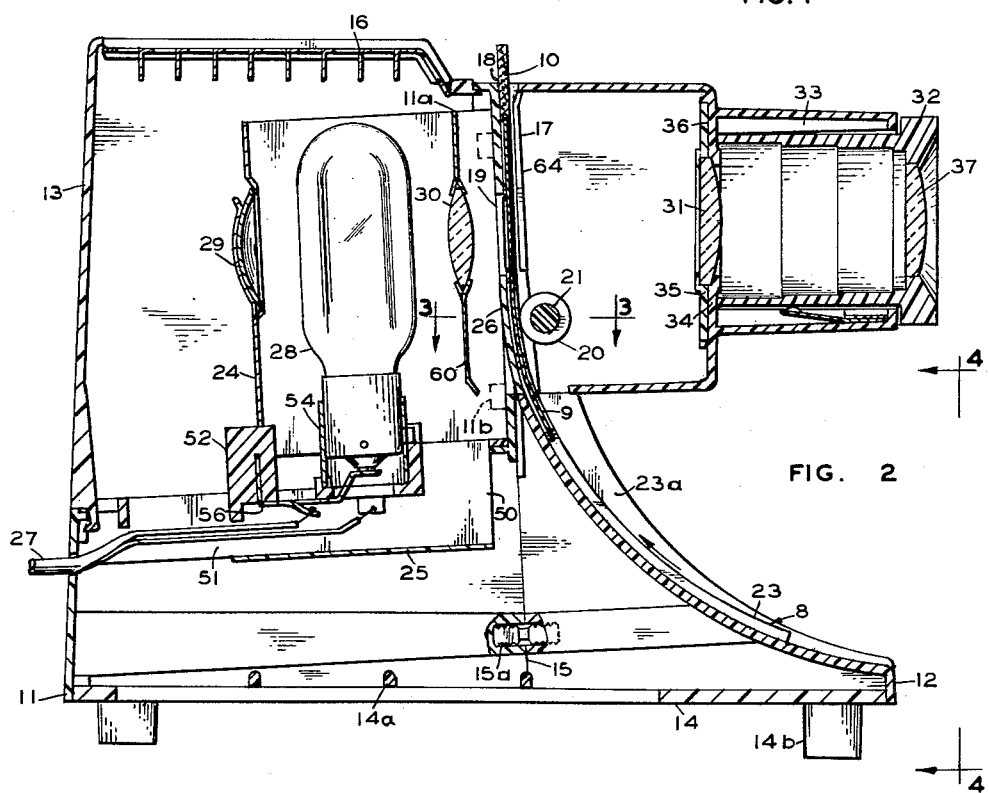
FIG. 2 is a vertical section of the projector taken along line 2—2 of FIG. 1.
Figure 3:
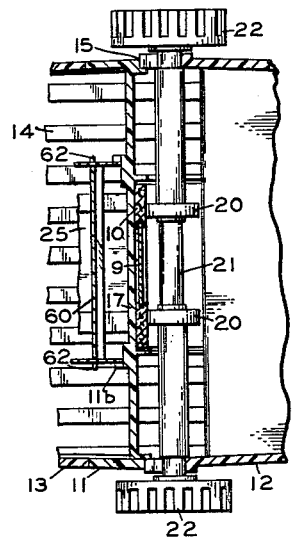
FIG. 3 is a horizontal section taken along line 3—3 of FIG. 2.

The guide 17 (FIGS. 2 and 3) is substantially vertical except for its lower end which blends into the guide 23, and is a channel opening forwardly. Overhanging retaining lips 64 are positioned at the sides of the guide 17 to retain the strip slide against the back wall or bottom of the guide 17, which is of particular importance at the aperture 19. The extreme upper portions of the lips 64 slant forwardly to provide an enlarged portion of the passage in the guide 17 for reception of the slide if it is desired to feed the slide into the projector from the top thereof.

The above-described projector is effective to project images of the transparencies 9 successively with a minimum of moving parts. The projector has a very low overall height while handling the elongated slide 8 without breaking the slide mount 10 during feed of the slide.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a projector,
a base portion,
a substantially vertical aperture plate having an aperture positioned above the base portion,
projector lens means projecting forwardly from the aperture plate and in an elevated position,
and a guide channel positioned under the lens means and facing upwardly and forwardly,
the upper end of the guide channel being adjacent the lower end of the aperture for guiding a picture strip to and from the aperture,
the guide channel being curved so as to extend substantially vertically at the upper end thereof and substantially horizontally at the lower end thereof.
2. In a projector,
housing means having a front wall provided with an arcuate strip-guiding portion projecting forwardly and downwardly and also having an opening at the upper end of the guide portion,
the arcuate strip-guiding portion comprising an arcuate channel open at the upper side thereof,
aperture plate means having an aperture and extending upwardly from the opening and the strip-guiding portion,
a light source for supplying light to the aperture,
and an objective positioned in front of the aperture.
3. In a low silhouette projector,
a front housing section having an upper tubular portion and a lower arcuate chute portion projecting downwardly and forwardly from the rear of the upper tubular portion,
a rear housing section having an aperture and also provided with guide means extending upwardly past the aperture from the upper end of the chute portion,
a light source in the rear housing section,
and lens means mounted slidably in the tubular portion.
4. In a projector,
a front housing section having an upper tubular portion and a lower arcuate chute portion projecting downwardly and forwardly from the rear of the upper tubular portion,
a rear housing section having an aperture and guide means extending upwardly past the aperture from the upper end of the chute portion,
a light source in the rear housing section,
lens means mounted slidably in the tubular portion,
a lamp housing detachably secured to the upper portion of the rear housing section,
and a bottom grill supporting the front and rear housing sections.
5. In a low silhouette projector,
a front housing section of plastic material having an upper tubular portion and a lower arcuate channel-shaped guide projecting downwardly and forwardly from the rear of the upper tubular portion for guiding a strip slide,
a rear housing section of plastic material having an aperture and guide means extending upwardly past the aperture from the upper end of the guide,
a light source in the rear housing section,
and lens means mounted slidably in the tubular portion of the front housing section.
6. In a projector,
a lens,
a rear housing having a vertical aperture plate at the front thereof,
the aperture plate having an aperture positioned near the upper end of the rear housing,
a front housing attached to the front of the rear housing and having a lens holding portion extending forwardly from the aperture and also being provided integrally therewith with an open arcuate guide channel facing upwardly and forwardly and positioned under the lens holding portion and extending rearwardly and upwardly to a portion of the aperture plate below the aperture for guiding a semi-flexible elongated slide mount in an arcuate path to and from the aperture plate,
and guide means carried by one of the housings for holding such a slide mount against the front face of the aperture plate.
7. In a projector,
a lamp,
a lens,
housing means having a rear portion carrying the lamp in a position spaced above the bottom of the housing means and a tubular front portion carrying the lens and spaced upwardly from the bottom of the housing means,
a vertical aperture plate having an aperture in optical alignment with the lamp and the lens and positioned between the front portion and the rear portion,
an open arcuate guide channel abutting at one end thereof a portion of the aperture plate positioned below the aperture and extending downwardly and forwardly from the aperture plate under the front portion of the housing means for guiding a semi-flexible transparency mount to the aperture plate,
and feed roller means adapted to engage a portion of such a mount positioned just below the aperture and hold the mount against the aperture plate.

References Cited by the Examiner
UNITED STATES PATENTS 1,186,192 6/16 Hoffman _____ 88—28
2,783,680 3/57 Goldberg _____ 88—26 X
2,916,964 12/59 Paulsohn.

NORTON ANSHER, *Primary Examiner.*
JULIA E. COINER, *Examiner.*